Nov. 4, 1930.    W. E. SMITH    1,780,408
INSECT REPELLER
Filed Jan. 31. 1929

Inventor
Walter E. Smith
by Heard Smith & Tennant
Attys.

Patented Nov. 4, 1930

1,780,408

UNITED STATES PATENT OFFICE

WALTER E. SMITH, OF DAYTONA BEACH, FLORIDA

INSECT REPELLER

Application filed January 31, 1929. Serial No. 336,467.

This invention relates to a device for repelling attacks of mosquitoes, flies and other insect pests and has for its object to provide a novel device which can be inconspicuously worn on different parts of one's clothing and which will be effective in repelling the attacks of mosquitoes and other insects.

The device comprises a container which is adapted to hold an insecticide or an insectifuge either in solid or liquid form and which is provided with a pin, clasp or some other similar means for attaching it to some part of the clothing. The container is made with openings through which the odor of the insecticide or insectifuge can readily escape and said container is so made that when worn it is relatively inconspicuous.

If it is desired to use a liquid insectifuge I propose to employ an absorbent pad in the container which may be saturated with the liquid insectifuge. The container is preferably so made that the saturated pad will be exposed all around the periphery thus providing for the free escape of the odor of the insectifuge.

In order to give an understanding of the invention I have illustrated in the drawings a selected embodiment thereof which will now be described after which the novel features will be pointed out in the appended claims.

Figure 1:
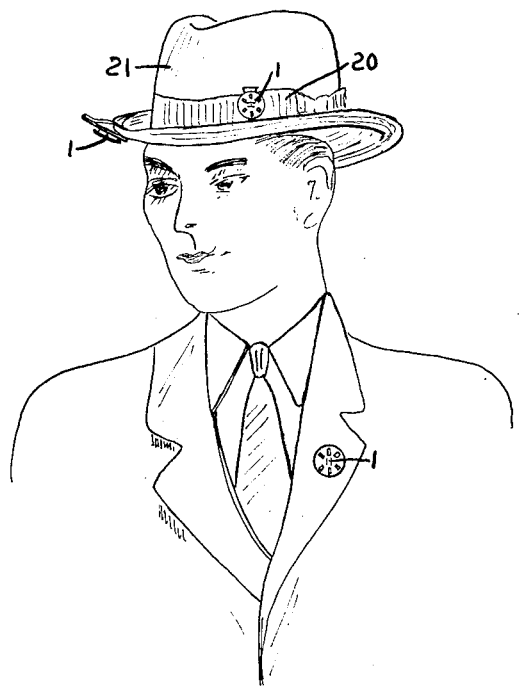
Fig. 1 is a view showing an individual and illustrating some ways in which my improved insect repeller may be used.

As stated above a device embodying my invention comprises a container adapted to contain the insecticide or insectifuge and adapted to be fastened to some portion of a person's garments or wearing apparel.

In the selected embodiment of the invention the container is shown generally at 1 and it is formed with a body portion 2 and a cap portion 3. The body portion 2 is preferably cup-shaped and is provided at its periphery with an outwardly-extending flange 4. The cap portion 3 is shown as somewhat larger than the body portion 2 and it has struck up therefrom a plurality of fingers 5 which are bent backwardly and the ends of which are bent over the flange 4 as shown at 6. These fingers provide means for attaching the cap member 3 to the body member 2 and the method of attachment is such that the cap member will be spaced from the flange 4 of the body member thus leaving an annular space between the two parts of the container. If the insectifuge or insect-repelling material is in solid form then it will fill the space within the container and because of the manner in which the cap 3 is secured to the body 2 said member will be exposed at the gap between the body 2 and cap member 3, this exposure extending clear around the periphery of the body member.

Figure 7:
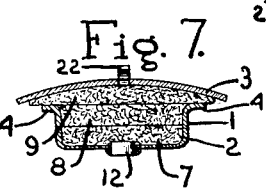
Fig. 7 is a section on the line 7—7, Fig. 2.

If, on the other hand, the insectifuge is in liquid form then I propose to fill the interior of the container with absorbent material such as felt. In the drawings I have shown the felt filler in layers 7, 8 and 9 and the upper layer 9 extends over and beyond the flange 4 so that the periphery of the upper layer 9 will be exposed all around the container on the outside of the flange 4 as clearly seen in Fig. 7. Because of the fact that the absorbent material is thus exposed around the periphery of the container the odor of the insectifuge can be discharged from all sides thus making a very effective insect repellent.

Figure 2:
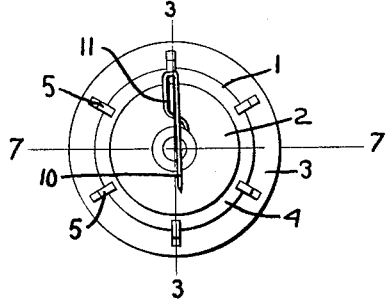
Fig. 2 is an under side view of a device embodying my invention showing it provided with a pin by which it may be attached to the garment.
Figure 3:
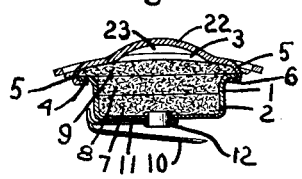
Fig. 3 is a section on the line 3—3, Fig. 2 but showing the pin partly in side elevation.

The container may be secured to the clothing in any approved way. In Figs. 2 and 3 I have illustrated for this purpose a pin 10, the latter having a shank portion 11 which is secured to the body of the container in some appropriate way as by means of the tubular rivet 12. This rivet is shown as located centrally of the container and the shank 11 extends from the rivet out toward the periphery of the container and then is bent back on itself to form the penetrating portion of the pin.

Figure 4:
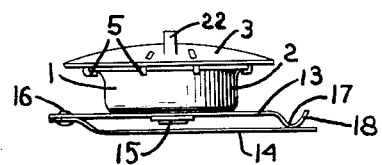
Fig. 4 is a side view of a device embodying my invention but provided with a clip for attaching it to the hat band or edge of a garment.
Figure 5:
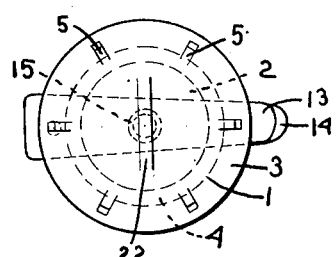
Fig. 5 is a top plan view of Fig. 4.
Figure 6:
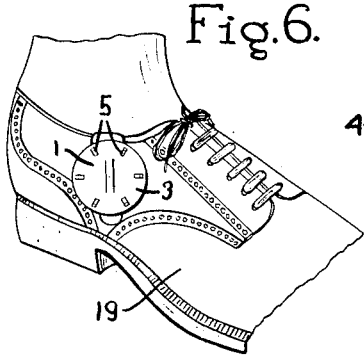
Fig. 6 illustrates how the device may be worn in connection with the shoe to prevent mosquitoes from attacking one's ankles.

In Figs. 4 and 5 I have illustrated a clip device for securing the container to some portion of the garment. This clip device comprises two jaws 13 and 14, one or both of which may be resilient. The jaw 13 is shown as secured to the under side of the container in some suitable way as by means of a rivet 15 and the jaw 14 is secured to the jaw 13 at one end as shown at 16.

One of the jaws, the jaw 13 in the present embodiment of the invention, is bent at one end as shown at 17 to provide a gripping portion, said end having the upwardly-inclined portion 18 that forms with the end of the jaw 14 a tapering throat through which the edge of a garment may be inserted.

The form of device shown in Figs. 4 and 5 is adapted to be applied to the edge of any garment or part of a garment. For instance, it can be worn on the brim of the hat 21 or on the hat band 20 as shown in Fig. 1 by simply inserting the hat band or the brim of the hat between the jaws 13, 14 or it may be worn on the edge of a coat or vest or even might be worn on the shoe 19 as shown in Fig. 3 wherein the two jaws are slipped over the edge of the shoe.

The cap member 3 is made larger than the body 2 so that when the device is applied to any part of the wearing apparel the body is hidden from view by the cap member and as this cap member can be given a more or less ornamental appearance the presence of the device on the cloth does not present an unsightly appearance, rather it may be so made as to be of an ornamental nature.

I have herein shown the cap member 3 as having the central portion 22 struck up therefrom thus providing an opening 23 through which liquid insectifuge may be deposited into the container.

While I have illustrated herein some selected embodiments of the invention I do not wish to be limited to the constructional features shown.

I claim:

1. An insect repeller comprising a body portion having a peripheral flange, absorbent material containing insectifuge filling said body portion and overlying the flange, and a cap member overlying the absorbent material and secured to said flange, the absorbent material which overlies the flange spacing the cap member from the body member.

2. An insect repeller comprising a body portion having a peripheral flange, absorbent material containing insectifuge situated within the body portion and overlying the flange and a cap member having fingers struck up therefrom which embrace the flange, the portion of the absorbent material overlying the flange maintaining a space between said flange and the cap member through which the odor of the insectifuge may escape.

3. An insect repeller comprising a body portion adapted to contain insect-repelling material, said body portion having a peripheral flange and a cap member having fingers struck up therefrom and embracing the flange, said cap member being spaced from the flange to provide an annular opening through which the odor of the insect-repelling material may escape, and a fastening device secured to the body portion by which it may be fastened to the article of clothing.

In testimony whereof, I have signed my name to this specification.

WALTER E. SMITH.